Dec. 8, 1936.   C. S. SHOEMAKER   2,063,350
MANUFACTURE OF LAMINATED GLASS
Filed May 6, 1933   2 Sheets-Sheet 2

INVENTOR
Charles S. Shoemaker
By Byrnes, Stebbins,
Parmelee & Blenko
Attorneys

Patented Dec. 8, 1936

2,063,350

UNITED STATES PATENT OFFICE 2,063,350

MANUFACTURE OF LAMINATED GLASS

Charles S. Shoemaker, Jeannette, Pa., assignor to American Window Glass Company, Pittsburgh, Pa., a corporation of Pennsylvania Application May 6, 1933, Serial No. 669,739

7 Claims. (Cl. 49—81)

This invention relates to the manufacture of laminated glass, and provides an improved method of making the same and apparatus for carrying out my improved method of manufacture.

Laminated or strengthened glass has heretofore been manufactured by numerous processes and by the use of various materials as the strengthening medium to be interposed between the glass sheets and rigidly united thereto. Cellulose composition materials, such as cellulose nitrate and cellulose acetate, have been used extensively as the strengthening medium. Where such materials have been used as the strengthening medium, sheets thereof have been united to the glass sheets by various materials and by various processes.

In the copending application of Frederic L. Bishop, and Charles S. Shoemaker, Serial No. 658,598, filed February 25, 1933, there is shown and described a method of manufacturing laminated glass wherein a solution of a strengthening material is flowed on the glass sheets, allowed to dry, and two coated glass sheets united together with the coated surfaces in juxtaposed relationship. In the above referred to copending application, the solution of strengthening material described is an ester of a monobasic fatty acid, namely, an acrylic acid ester. The present invention relates to the drying of the solution after a layer thereof has been formed on the glass sheets. My invention, however, is not limited to the drying of the solution of the particular strengthening material disclosed in the above referred to copending application. My invention may be practiced where the solution of strengthening material disclosed in the referred to application is used, or where any other solution of strengthening material is formed as a layer on the glass sheets to be ultimately formed into a sandwich.

In the manufacture of laminated glass in accordance with my invention, a layer or film of the solution of strengthening material is formed on the glass sheets to be formed into a sandwich. A solution comprising an acrylic acid ester and ethylene dichloride, which is a solvent for the acrylic acid ester, may be used. Solvents other than ethylene dichloride, of course, may be used, such as dibutyl phthalate. Even where ethylene dichloride is used as the particular solvent for the acrylic acid ester, dibutyl phthalate may be used in the solution in order to aid in the elimination of bubbles from the coatings on the glass sheets. The preferred solution described in the above application contains between 3 and 8% of dibutyl phthalate. It also contains an appropriate quantity of the principal solvent, that is, ethylene dichloride, in order to make the solution of the proper viscosity.

The solution of strengthening material may be flowed on the glass sheets by hand or by various types of flowing machines. It is preferable to flow the solution uniformly over the glass sheets by means of a flow machine, for much better results can be obtained by the use of such a machine than can be obtained by flowing the solution on the glass sheets by hand. So far as the present invention is concerned, it is entirely immaterial in what manner the solution of strengthening material is flowed on the glass sheets.

After the solution of strengthening material has been flowed on the glass sheets, they may be immediately transferred to a heating or drying room. Where a solution of an acrylic acid ester is used, it has been found desirable to spray the coating formed on each glass sheet with a solvent or plasticizer for the acrylic acid ester, such as dibutyl phthalate. A very thin film of the dibutyl phthalate is sprayed on the coating prior to the drying operation hereinafter described. Approximately 1 c. c. per square foot gives highly desirable results. When the coating is sprayed in this manner with the solvent or plasticizing agent for the acrylic acid ester, any bubbles that have been formed in the coating are entirely removed. The dibutyl phthalate prevents a skin from forming on the top of the coating until after all of the bubbles have been eliminated from the coating. It will be understood that this treatment of the solution of strengthening material forms no part of my invention, and that my invention may be practiced whether or not the coating is sprayed with such an agent. It has been found that highly desirable results can be obtained where the spraying operation above referred to is eliminated, and sufficient dibutyl phthalate or other solvent or plasticizing agent is included in the solution flowed on the glass sheets. It has also been found that desirable results can be obtained where the dibutyl phthalate is placed on the glass sheets prior to the flowing of the solution of strengthening material thereon.

After the glass sheets have been coated in the desired manner, they are transported to a drying room or oven, such as that which I provide, and the coatings on the glass sheets dried in accordance with my improved method. The glass sheet may be transferred to the drying room or oven on racks which maintain the coated sheets in a substantially horizontal position. This is highly desirable for if they are not retained in a substantially horizontal position, there will be a tendency for the coating to flow over the surface of the glass sheet.

In the accompanying drawings I have shown for purposes of illustration only, the improved apparatus which I provide and which may be used in carrying out my improved method of drying the coatings on the glass sheets.

In the drawings—

Figure 1:
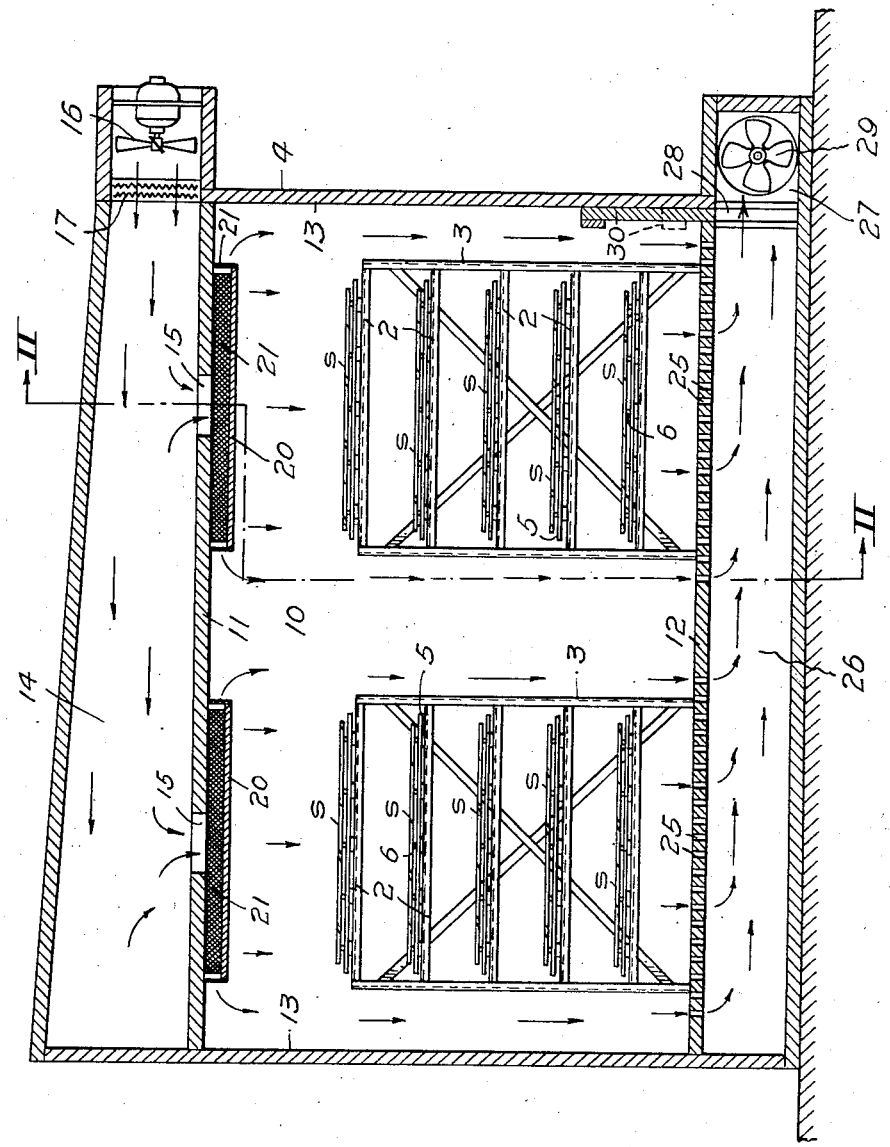
Figure 1 is a sectional elevational view through the apparatus which I provide.
Figure 2:
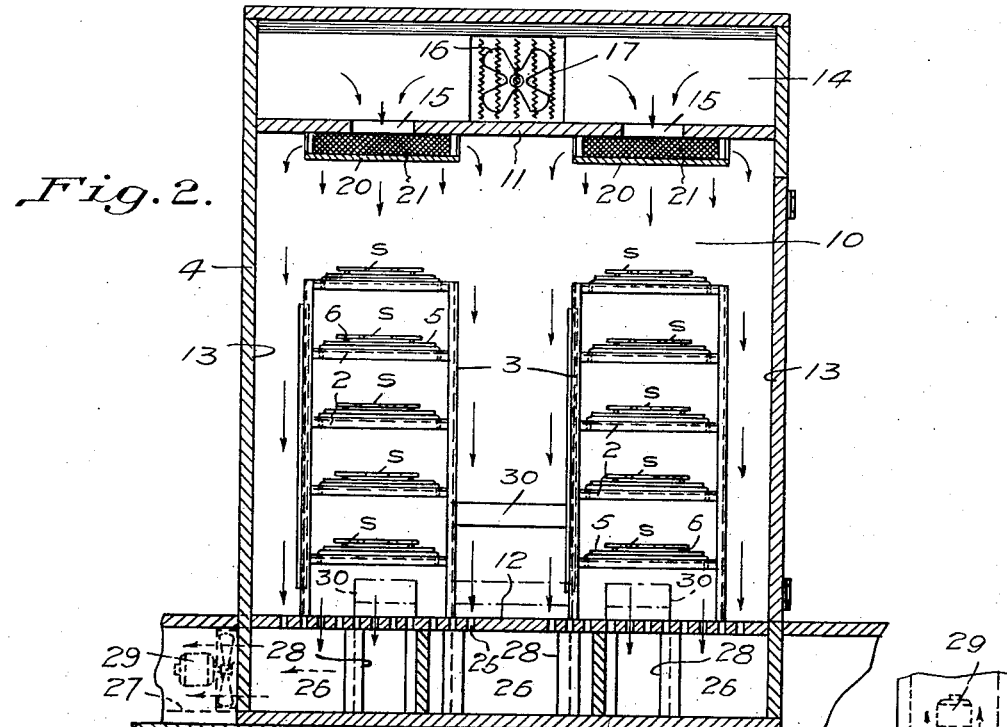
Figure 2 is a sectional view taken along the line II—II of Figure 1.
Figure 3:
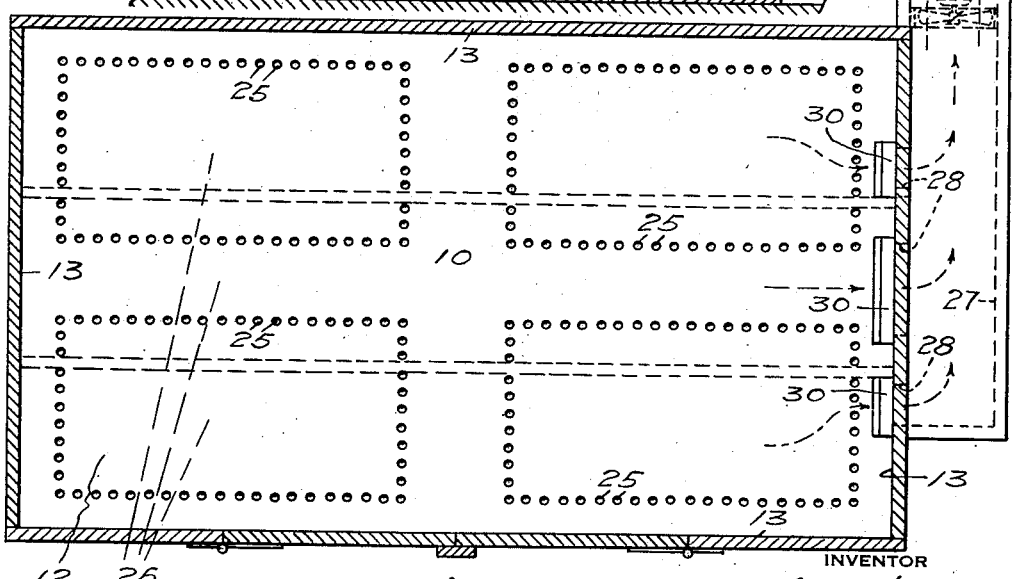
Figure 3 is a plan view of the floor of the drying room or oven shown in Figures 1 and 2.

In carrying out my improved drying process in the apparatus shown in the drawings, the coated glass sheets S are placed on spaced shelves 2 on the racks 3. The racks 3 shown in the drawings are stationary but it will be readily understood that rollers may be provided thereon so that the racks may be moved into or out of the drying oven with the glass sheets thereon.

In the drawings, a plurality of racks is shown in the drying room or oven 4. In the drying room shown in the drawings, provision is made for four racks, but it will be understood that the drying room may be so arranged as to receive any number of such racks. Each shelf 2 of each rack 3 carries a glass sheet 5 which is of slightly larger area than the area of the glass sheet to be supported on the shelf of the rack. Leveling screws 6 are provided for leveling the glass sheet placed thereon and supported thereby. Any desired number of such leveling screws may be provided for adjusting and maintaining the glass sheets in a horizontal position.

The drying room or oven 4 is provided with a main chamber 10 having a top wall 11, a floor 12, and side and end walls 13. A horizontally extending duct 14 is provided above the top wall 11 of the chamber 10 for supplying air to the drying chamber. Openings 15 are provided in the top wall 11 for permitting air to pass from the horizontally extending duct 14 into the chamber 10. These openings 15 are centrally located above the drying racks; that is, an opening 15 is provided above each drying rack. Heated air is supplied to the horizontally extending duct 14 by means of a fan 16 which forces air past heating elements 17 into the duct 14. A baffle plate 20 is provided between each opening 15 and the rack therebelow. Each baffle plate 20 is spaced below the ceiling or top wall 11 and a screen 21 provided between the baffle plate and the ceiling on all sides so that air entering the drying chamber 10 will pass through the openings 15 and strike the baffle plates 20 and pass horizontally into the drying chamber through the screen. This prevents the entering air from detrimentally affecting the uppermost sheet of glass on the rack.

The floor 12 of the drying chamber is provided with a plurality of spaced discharge openings 25. These spaced openings are so arranged as to surround each rack on all sides.

Horizontally extending ducts 26 are provided below the floor 12 of the drying chamber 10. These horizontally extending ducts 26 open into a header 27 through openings 28. A fan 29 is provided in the header 27 to aid in the removal of air and gases from the ducts 26, and to stimulate circulation through the drying chamber 10. A damper 30 is provided adjacent each opening 28 for the purpose of permitting a further regulation of the flow of the air and gases through the ducts 26 and the drying chamber 10.

The drying air currents pass into the drying chamber from the duct 14 through the openings 15 and, by reason of the arrangement of the openings in the floor and the baffles 20 with respect to the position of the racks, they pass in a vertically extending direction through the drying chamber along the edges of the racks and pass out through the discharge openings 25 into the horizontally extending ducts, thence through the openings 28 into the header 27, from which they are discharged by the fan 29. It will be understood, of course, that a portion of the air circulates across the surfaces of the glass sheets.

Where the solution flowed on the glass sheets comprises an acrylic acid ester and a solvent therefor, such as ethylene dichloride, drying in the manner above described is highly advantageous. The solvent ethylene dichloride is considerably heavier than air and naturally tends to pass downwardly when it is released from the coating. The vertically travelling air currents pick up the solvent and carry it vertically along the edges of the racks and eddy currents are not permitted to form. If the solvent is not properly disposed of after being liberated from the coating, it will cause non-uniform drying, which in turn will result in a streaked and otherwise unsatisfactory product.

In drying the glass sheets, the temperature of the oven is gradually raised from approximately room temperature to a point above the boiling point of the solution so that the solvent will be driven off. I have found that highly desirable results can be obtained by raising the temperature of the oven or drying chamber to 120° during the first half hour that the coated sheets are therein, raising it to 140° during the next half hour, raising it to 160° during the next half hour, raising it to 175° during the next half hour, retaining it at 175° for one-half hour, and raising it to and retaining it at 190° during the next one and one-half hours. It will be understood that the above temperatures have been found highly desirable where the coating is a solution of an ester of acrylic acid. It will be understood that the drying can be carried out in various manners, and that the above is merely a description of one of the preferred drying procedures where the particular solution referred to is used. In any event, it is desirable that the coated glass sheets be placed in a dust-free and dry atmosphere at a predetermined temperature below the boiling point, and gradually raised to a temperature above the boiling point of the solution comprising the coating, the drying being completed above the boiling point of the solution.

I have found that highly desirable results can be obtained by drying at sub-atmospheric pressures. Accordingly, the fans or apparatus above described will be operated in such a manner as to maintain a sub-atmospheric pressure in the drying chamber. I have found that a sub-atmospheric pressure of one millimeter of water gives highly desirable results where the coating on the glass sheets is a solution comprising an acrylic acid ester and a solvent therefor which is heavier than air, such as ethylene dichloride.

After the glass sheets have been dried, they may be transferred to a spraying table where the coatings are sprayed with a plasticizing agent. Thereafter, a sandwich of two so-coated and treated glass sheets are rigidly united together by pressure. The pressing operation may be carried out in the presence of heat, although this is not absolutely essential in order to get a satisfactory union between the sheets.

While I have shown and described a preferred embodiment of my invention and the preferred method of practicing the same, it will be understood that I do not intend to be limited thereby, but that my invention may be otherwise practiced or embodied within the scope of the appended claims.

I claim:

1. In the manufacture of laminated glass, the steps comprising forming a film of a solution comprising a strengthening material and a solvent therefor on a glass sheet, passing heated air substantially vertically along the edges of said coated sheet while maintaining the sheet in a substantially horizontal position, whereby the film is dried, and thereafter uniting said coated sheet to a second glass sheet.

2. In the manufacture of laminated glass, the steps comprising forming a film of a strengthening material on a glass sheet, passing heated air substantially vertically downwardly past said coated sheet while maintaining the sheet in substantially horizontal position, whereby the film is dried, and thereafter uniting said coated sheet to a second glass sheet.

3. In the manufacture of laminated glass, the steps comprising forming a film of a solution of a strengthening material and a solvent on a glass sheet, passing heated air substantially vertically downwardly past said coated sheet while raising the temperature of the film to above the boiling point of the solvent, the sheet being maintained in a substantially horizontal position, whereby the film is dried, and thereafter uniting said coated sheet to a second glass sheet.

4. In the manufacture of laminated glass, the steps comprising forming a coating of a solution comprising a strengthening material and a solvent on a glass sheet, and drying the coating by passing heated air vertically past the edges of the glass sheet while maintaining a sub-atmospheric pressure adjacent the coating, the sheet being maintained in a substantially horizontal position during the drying operation.

5. In the manufacture of laminated glass, the steps comprising forming a coating of a solution comprising a strengthening material and a solvent on a glass sheet, and drying the coating by passing heated air substantially vertically past the edges of the glass sheet to substantially remove the solvent therefrom, the heat supplied being sufficient to raise the temperature of the film to above the boiling point of the solvent therein, and the sheet being maintained in substantially horizontal position during the drying operation.

6. In the manufacture of laminated glass, the steps comprising forming a coating of a solution comprising a strengthening material and a solvent on a glass sheet, and drying the coating by passing air in a vertically extending direction over said glass sheet, the temperature of the air being initially below the boiling point of the solvent, and being gradually raised to above the boiling point of the solvent, the sheet being maintained in substantially horizontal position during the drying operation.

7. In the manufacture of laminated glass, the steps comprising forming a coating of a solution comprising a strengthening material and a solvent on a glass sheet, and drying the coating by passing air vertically downwardly along the edges of said glass sheet, the temperature of the air being initially below the boiling point of the solvent and being gradually raised to above the boiling point of the solvent while maintaining a sub-atmospheric pressure adjacent the coating, the sheet being maintained in substantially horizontal position during the drying operation.

CHARLES S. SHOEMAKER.